E. McGARVEY.
AUTOMATIC SCALE.
APPLICATION FILED NOV. 4, 1915.
1,205,768.
Patented Nov. 21, 1916.
5 SHEETS—SHEET 1.
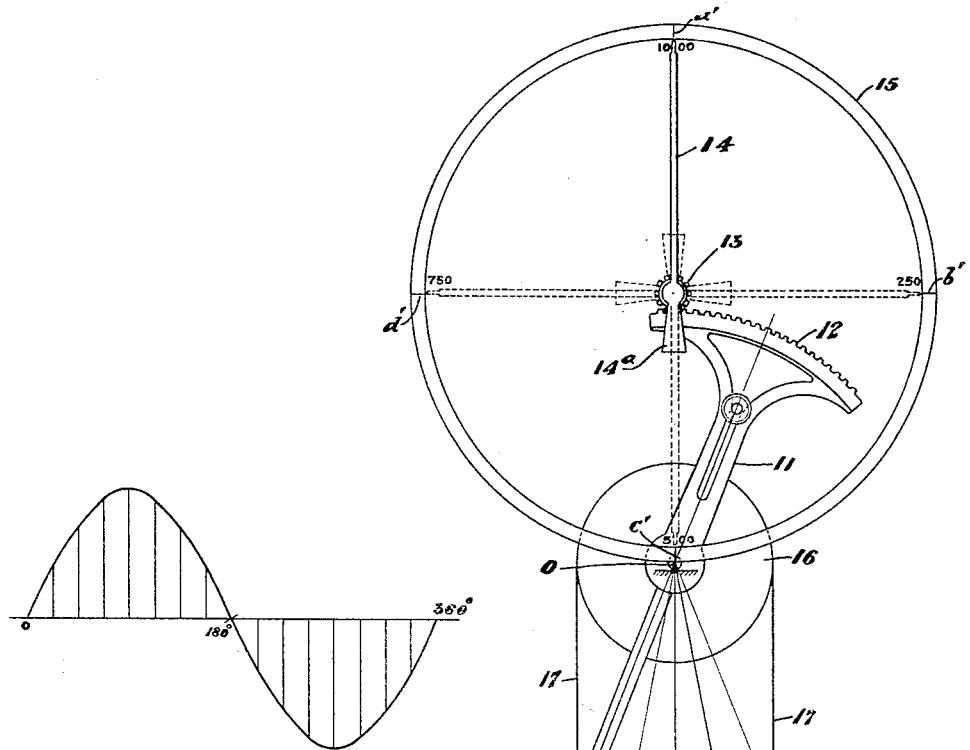
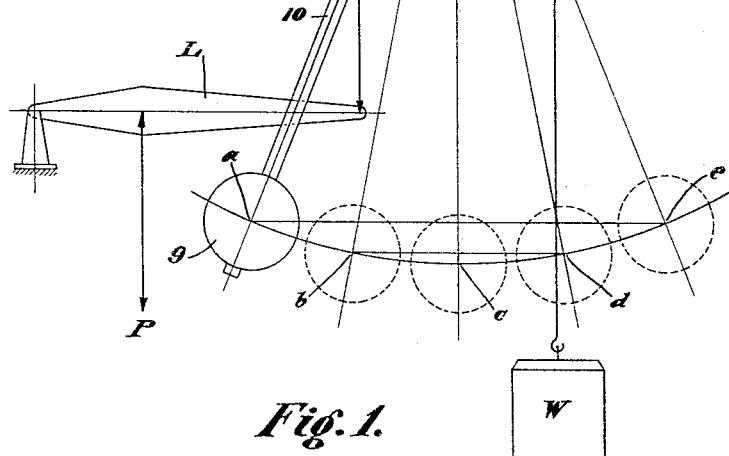
Fig. 2.
Fig. 1.
Witnesses:
Inventor
Edward McGarvey
by O. M. Clarke
Atty E. McGARVEY.
AUTOMATIC SCALE.
APPLICATION FILED NOV. 4, 1915.
1,205,768.
Patented Nov. 21, 1916.
5 SHEETS—SHEET 3.
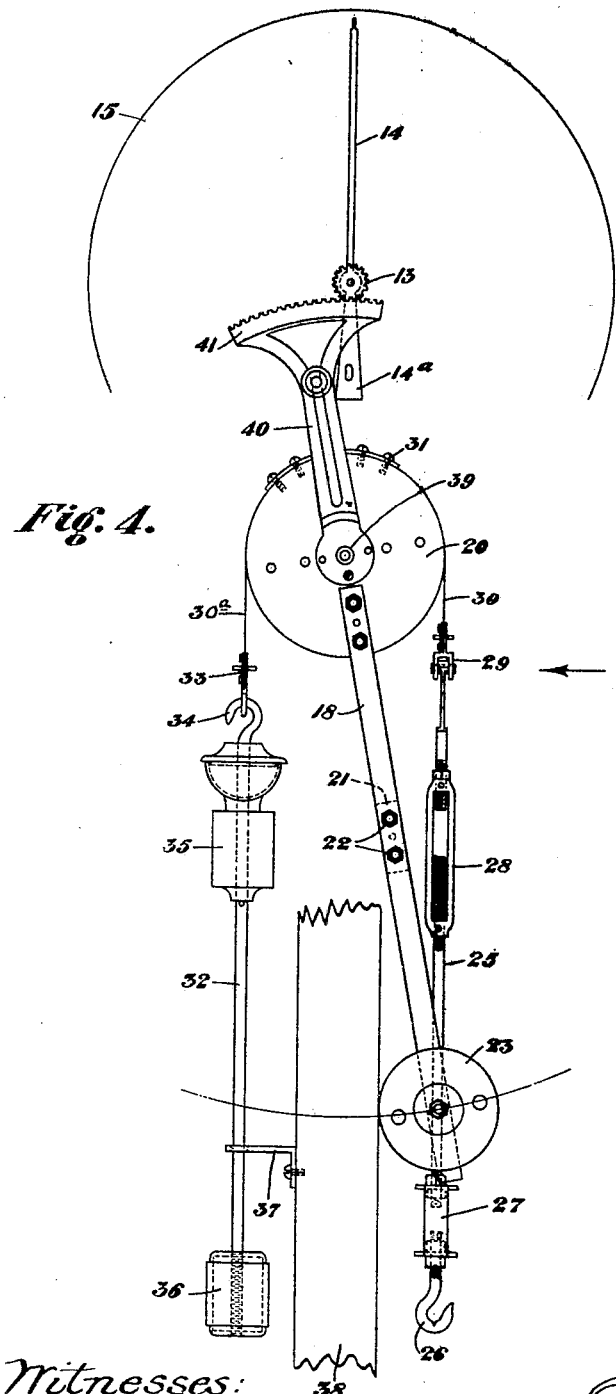
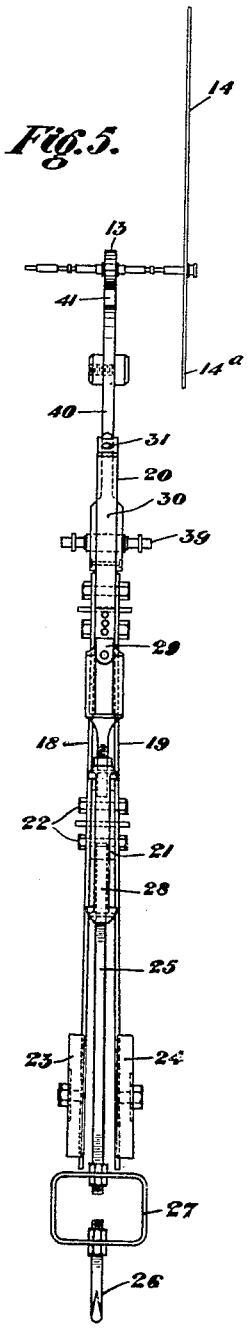
Fig. 4.
Fig. 5.
Witnesses:
Inventor
Edward McGarvey
by C. M. Clarke
Atty E. McGARVEY.
AUTOMATIC SCALE.
APPLICATION FILED NOV. 4, 1915.

1,205,768.

Patented Nov. 21, 1916.
5 SHEETS—SHEET 4.

Witnesses:

Inventor
Edward McGarvey
by C. M. Clarke
Atty

UNITED STATES PATENT OFFICE.

EDWARD McGARVEY, OF BEAVER FALLS, PENNSYLVANIA, ASSIGNOR TO THE STANDARD SCALE & SUPPLY COMPANY, OF PITTSBURGH, PENNSYLVANIA, A CORPORATION OF DELAWARE.

AUTOMATIC SCALE.

1,205,768. Specification of Letters Patent. Patented Nov. 21, 1916.

Application filed November 4, 1915. Serial No. 59,542.

*To all whom it may concern:*

Be it known that I, EDWARD McGARVEY, a citizen of the United States, residing at Beaver Falls, in the county of Beaver and State of Pennsylvania, have invented certain new and useful Improvements in Automatic Scales, of which the following is a specification.

My invention relates to weighing scales, and more particularly to indicating scales employing the pendulum principle. Its primary objects are, to provide a simple and accurate compensation for the varying lever arm of a pendulum weight, to provide for use of a pendulum balance without introducing error in the indicating scale, to simplify the mechanism, and to generally improve the construction and operation of indicating scales of the pendulum type.

The invention is shown in several preferred forms in the accompanying drawings, wherein,—

Figure 3:
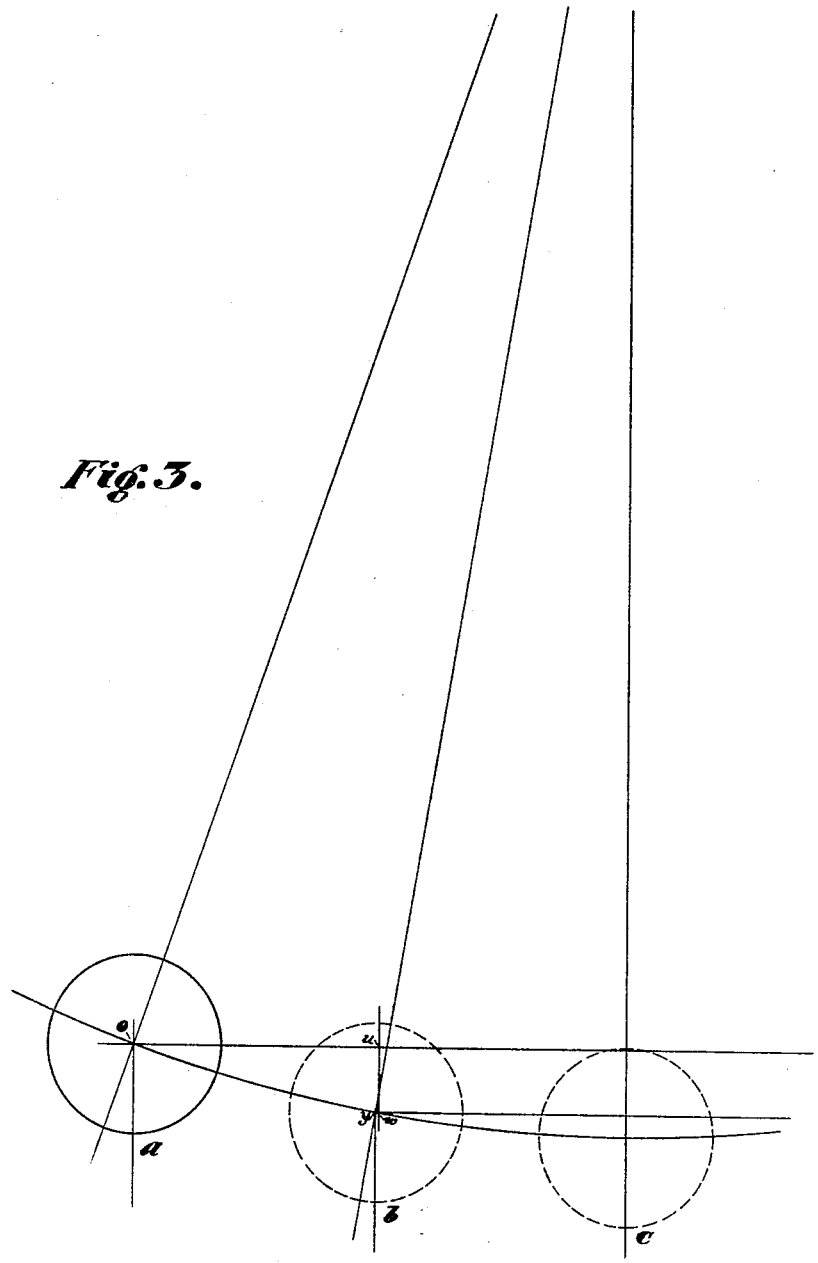
Figure 6:
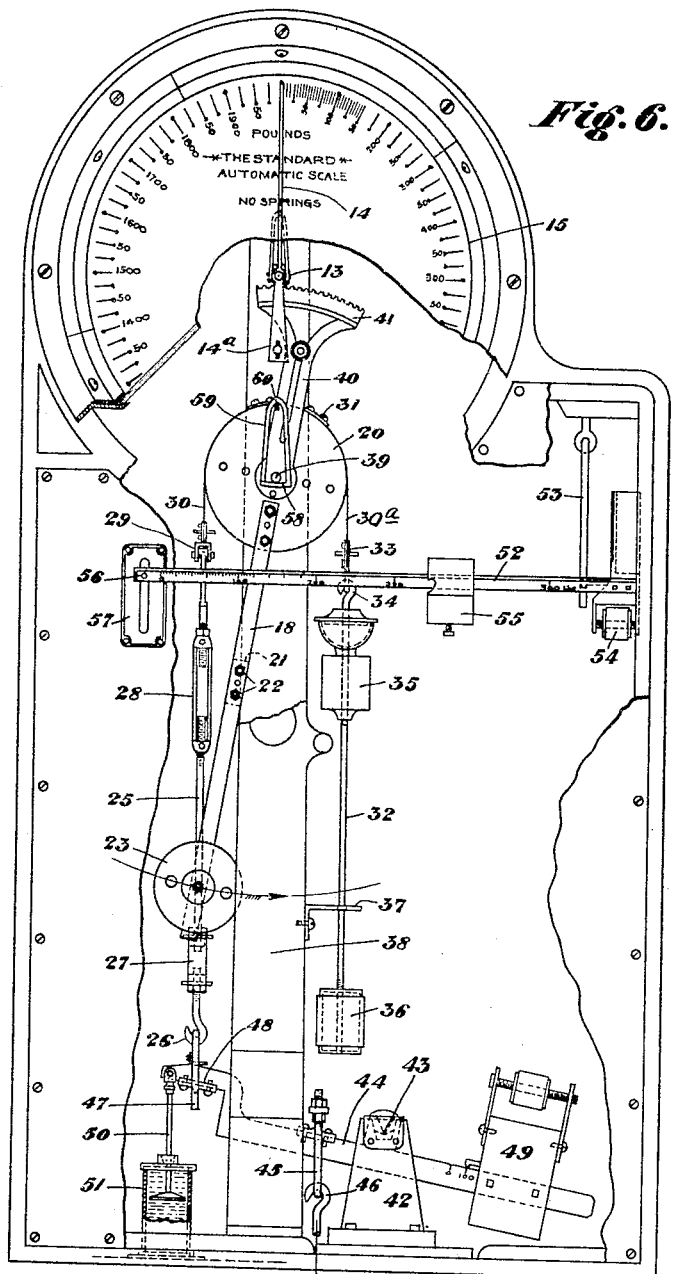
Figure 7:
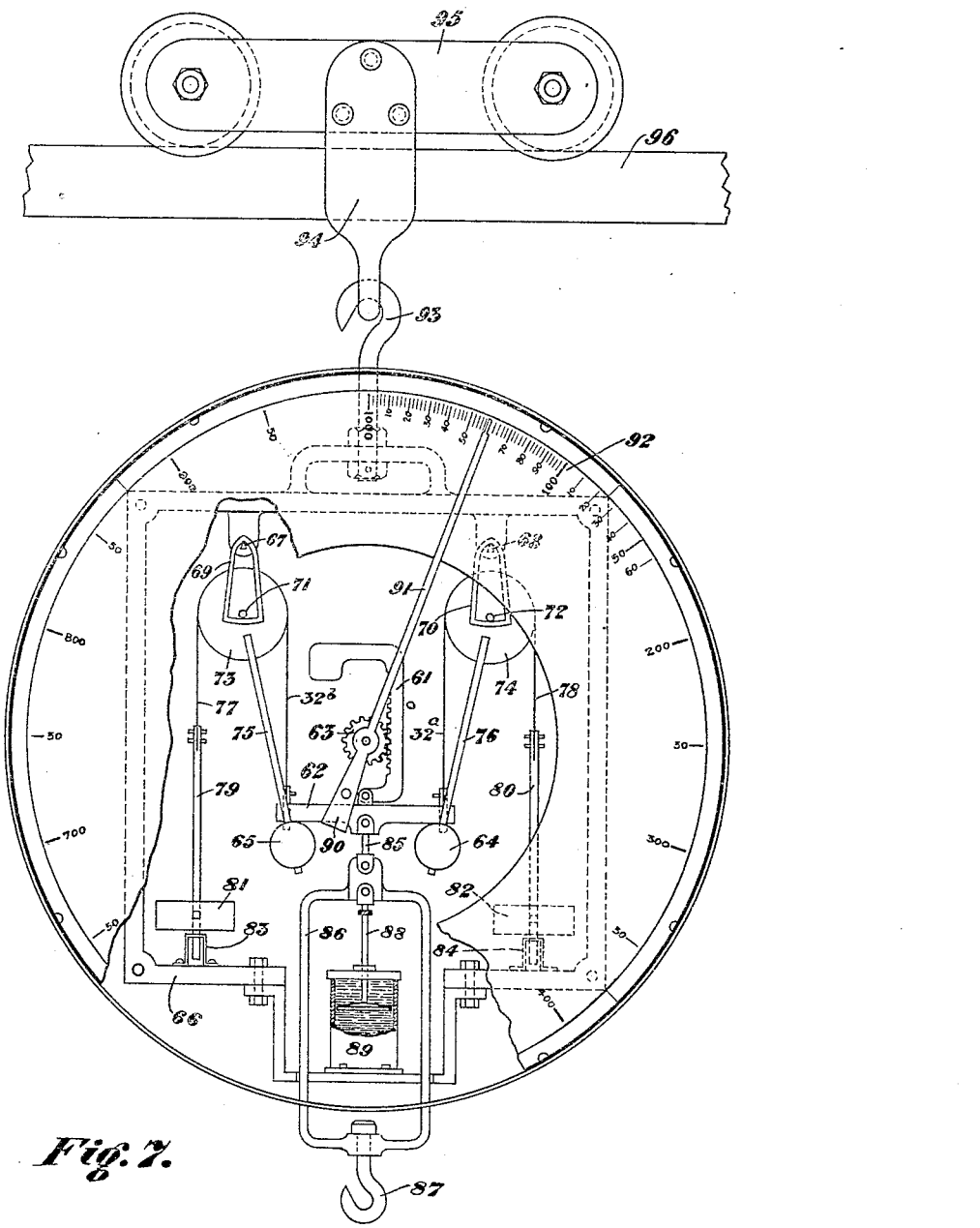

Figure 1 is a diagram of the principal operating elements showing the mode of compensation for the change of lever arm of the pendulum; Fig. 2 is a diagram of a sine curve for illustration of the theory of operation, and Fig. 3 is an enlarged diagram of several positions of the pendulum, for the same purpose. Fig. 4 is a side elevation of the actual mechanism embodying the principle of the diagram in Fig. 1, and Fig. 5 is an elevation of the same taken at right angles to that of Fig. 4. Fig. 6 is a front elevation of the mechanism of a complete scale employing my invention, embodied as in Figs. 4 and 5, and Fig. 7 is a similar view of a modified form of construction.

Automatic scales employing a pendulum counter-weight have been used heretofore; it has been found that to obtain accuracy over a wide range a very considerable angular movement of the pendulum was necessary in order to avoid greatly magnifying mechanical faults in the gearing employed. The balancing positions of the center of gravity of the pendulum for various increments of weight are not found at uniform increments of distance from the central or idle axis, because such distances are equal to the sines of the angles of rotation, and therefore not proportional to the arc of movement. Consequently it has been customary to vary the indications on the scales to correct this error by employing in the gearing a cam or eccentric in some form, so that the varying radius in one of the elements of the gearing compensates for the variation of the relation between the angular position of the pendulum and the actual effective counterweight. For example, it has been customary to mount the pendulum on a pivot which carries also fixed to the pendulum, an epicycloidal disk, to which is attached a steel tape supporting the weight, so that the effective lever arm of the weight will vary as required for the purposes above described.

In my invention I dispense with the use of cams or eccentric disks for the correction of errors caused by the varying relation referred to, and I make the necessary corrections by the use of a weighted pointer, by the peculiar relation of the position of the pointer to the successive positions of the pendulum, and by swinging the pendulum to both sides of a central vertical line. Thus, referring first to Fig. 1, let it be supposed that for the purpose of getting properly sized working parts for accuracy and durability, it is necessary for the pendulum to swing through an arc of 40 degrees $(a, o, e)$. Instead of arranging the pendulum to occupy the central position $o, c$, in its initial or idle condition, I arrange the parts so as to employ a motion of 20 degrees on each side of the vertical, so that when the dial indicator has moved through one-half of its circular path, the pendulum will hang in the vertical line. To make this effective, I use a back balance weight which tends to rotate the pendulum in a direction opposite to the direction it is moved by the applied weight. That is, I mount the pendulum 9 on a rod 10 pivoted at the point $o$, and on an upward extension 11 of the pendulum rod 10 I provide a rack 12 engaging a small pinion 13 rigidly attached to a pointer arm 14 traveling over a scale 15. On the pivoting shaft at the point $o$ I employ a circular disk 16, which moves with the pendulum arm 10 and carries steel tape 17, to one end of which is attached the weight lever L (at the point $f$), and on the other end of which is a back balance weight $w$, made of such size as to hold the pendulum 9 swung over to one side approximately 20 degrees from the vertical line $o, c$, when the pointer arm 14 is at zero. The gearing is so arranged that when the pendulum occupies the central position $o, c$, the pointer arm 14 will have made half a revolution, and when it occupies the position $o, e$, it will have made a complete revolution. Obviously then, when the tape 17 is exposed to a pull of one-half the maximum capacity of the scale, the pendulum will stand on the center line $o, c$; so that there are three positions of the pendulum which will accurately govern the three positions of the pointer arm 14, notwithstanding the disk 16 and the rack 12 are true circles.

The movement of the pointer arm 14 is a true and accurate indication of the angular movement of the pendulum rod 10; but inasmuch as the movement of the pendulum changes its balancing weight not in proportion to the distance along the arc $a, c, e$, but in proportion to the horizontal displacement of the center of gravity from the vertical line $o, c$,—that is a distance which is the sine of the angle of movement, the intermediate positions of the pendulum would not show on the dial a proper value. Specifically, if we applied to the beam L a weight P of 250 pounds, the pendulum would be brought to the position $o, b$, half the distance between the line $o, a$, and the line $o, c$. But this would not show on the dial a movement strictly to the horizontal position marked $b'$, because the center of gravity of the pendulum is not now half the horizontal distance from the position $a$ to the line $o, c$, but more than that amount, as will appear more clearly from the diagram of Fig. 3. That is, the pointer would show too much weight. (This is supposing the pointer arm 14 to be balanced about its pivot). Again, when 750 pounds has been applied at P, the pendulum will stand in the position $o, d$, which would cause the scale pointer 14 to show less than 750 pounds on the dial at the point $d'$. To compensate for these errors just pointed out, I add to the pointer 14 a counterweighted butt $14^a$ adjusted to such value as to retard the pointer at the position $b'$ an amount just sufficient to counter-balance the excessive increment of the motion due to the pendulum traveling more than one-half the horizontal distance from $a$ to the center line with the increment of 250 pounds weight. I therefore provide a symmetrical system in which the successive increments of weight follow the law of a true sine curve as shown in the diagram of Fig. 2, by which means moreover, I attain not two but three points where the balancing value of the pendulum coincides exactly with the angle of rotation. The extra weight on the butt of the pointer arm 14 will have a neutral effect at both of the vertical positions of the arm, and the effect will change from plus to minus sign in the two horizontal positions and in the travel of each intervening quarter circle on the scale, the effective value of the extra counter-weight varies according to the law of the sine curve in exactly the same way as the effective weight of the pendulum 9 varies in its travel.

Figs. 4 and 5 show in detail the principal elements of a practical embodiment of my invention, and Fig. 6 the complete mechanism. In Figs. 4 and 5 the pendulum rod consists of two flat bars 18, 19, bolted to a circular disk 20, and separated at about half the length by a spacer block 21 held by the bolts 22, and at the lower end carrying each one of the bob weights 23, 24. The pendulum rod 18, 19, is made of this split construction in order to allow the pendulum to pass the beam rod 25, and the back balance rod 32, in its extreme excursions to the right and left. This beam rod 25 is supplied at the bottom with a hook 26 attached to the rod by yoke 27, and near its top it is provided with an adjusting turnbuckle 28 to regulate its length, and above this yoke it is attached by a pivoting yoke 29 to a steel tape 30 which passes over the circular disk 20 being attached by screws 31, and having a continuation on the other side, $30^a$, carrying, by the pivoting yoke 33, the hook 34 of the rod 32 carrying the back balance weights 35, 36. This rod is preferably guided by passing through a hole or slot in the bracket 37 attached to the central standard 38, which also may support the pivot 39 of the disk 20. Also rigidly attached to the disk 20, there is an extension of the pendulum rod, 40, carrying at the top a circular rack 41 engaging the pinion 13 of the pointer arm 14. In Fig. 6 I show the mounting of this last described mechanism in an automatic dial box. A rigid stand 42 provided with bearings 43 carries the lever 44, which is connected to the platform by the yoke 45 and hooked rod 46, as will be understood, and its free end is attached to the beam rod hook 26 by a self-alining bearing loop 47 engaging a knife edge pivot 48 on the end of lever 44. Also on beam 44 I provide a weight 49 adapted to balance practically all the weight of the platform and the main levers, and avoid their being supported by the beam rod 25. I attach to the end of this beam 44 the plunger rod 50 of a dash-pot 51 in order to bring the parts to rest quickly at the balanced position.

In some cases I provide a graduated tare beam 52, pivoted on a swinging bearing 53 at one end, and at the other supported in a self-alining bearing in the terminal yoke 29 of the steel tape 30. A balancing weight 54 on the rear end of beam 52 serves to counterbalance the beam. A sliding poise 55 at zero position on the graduation exerts its whole weight on the beam rod 25, and at this position the scale is balanced. In case a truck or other carrier is on the scale, and its weight is desired to be deducted from the dial indication, the poise is moved on the tare beam 52 so as to shift the weight uniformly from the beam rod 25 to the hanging bearings 53. This beam may be prevented from undue swinging when the poise is moved by employing a pin 56 projecting through a slot in a plate 57 as shown.

The pivoting shaft 39 of the disk 20 rests upon the circular ground bottom 58 of yoke 59, which has a V-shaped top resting upon fixed knife edges 60 fixed in the frame of the machine or on the supporting post 38. The pin 39 thus rolls on the yoke, and without friction remains accurately under the knife edges 60 at all positions.

In Fig. 7 I show a modification arranged so as to employ two of the above described pendulum systems, operating on the same principle, but in a type of scale where smaller parts are required, and where changes of level must be compensated for. In this case the segmental rack 41 of the machine of Fig. 6 is replaced by a straight rack 61 whose vertical movement caused by the raising and lowering of the tapes 32ª, 32ᵇ, through the agency of the attached horizontal beam 62, moves the pointer pinion 63 in exact proportion to the angular movement of the pendulums 64 and 65. In the construction of Fig. 7 I provide in the casing a fixed rectangular frame 66 carrying, on integral lugs thereof the fixed knife edges 67 and 68, which support the links 69 and 70 in which roll pivoting shafts 71 and 72 of the disks 73 and 74 to which the pendulum bars 75 and 76 are attached. The tapes 77 and 78 are attached to rods 79 and 80, which carry the counter-weights 81 and 82, and are guided in friction cups 83 and 84. The beam 62 has pivoted to it by a pin 85 a yoke 86 carrying the hook 87, and this yoke preferably carries the plunger rod 88 of a dash-pot 89. This arrangement operates as follows: The weight being applied to the hook 87, applies equal weights to the two ends of beam 62, and this rotates the pendulums 64 and 65 equal distances in directions outward away from each other, carrying downward the rack 61 in direct proportion to the angular movement, and the correction for discrepancy between angular and horizontal movement is corrected as before described by means of the counterweight 90 of the pointer bar 91 as it travels over the scale 92. Should the machine be out of level both pendulums will automatically re-adjust their position, both swinging in the same direction, although one end of the beam 62 will fall, while the other rises and thus keep the center in the same position. The rack 61 is arranged close to this center, so that the error of being out of level is thus automatically corrected. It will be understood that this same arrangement would be applied to other styles of scales except for the attaching devices. It is here shown arranged as a portable scale, the frame 66 being attached to a hook 93 engaging the yoke 94 of a trolley carrier 95 mounted on a track 96.

Among the many advantages of the symmetrical system above described is the simplicity and ease of adjustment. It will be seen from the above explanation that when the indicating pointer is perfectly balanced it will show accurately the horizontal balancing value of the pendulum at the three points a, c, and e in Fig. 1, and that between these points the variation due to the difference between angular movement and lateral movement is accurately corrected by the simple device of over-weighting the butt of the pointer arm. That is, the compensating device, effects a variation of the indication according to the law of the sine curve of exactly the same value as, but in the opposite direction from the variations of actuating force of the pendulum in its angular movement.

Besides dispensing with all cams, eccentrics, and gearing of varying ratio, I may use stronger parts. For example, the disk 20 carrying the flexible tapes being of constant radius, and therefore causing at all positions the same bending moment on the tape, it is not necessary as heretofore to make the tape thin and flexible in order to avoid error. Moreover, this structure avoids possible error by reason of changes of temperature, because, the bending moment on the tape at the points where it comes in contact with disk 20 on the two sides, is opposite in direction, and counterbalances. The symmetry of the mechanism is in a large part due to the fact that the travel of the pendulum toward the two sides of the central vertical line is the same; it will be noted that only under such conditions do we attain the advantage of having three points on the scale directly determined by the angular movement of the pendulum. I entirely avoid any parts of the structure governed by the "rule of thumb" method. When the indicator arm is adjusted at 90 degrees of its travel, by adjusting the weighted butt, no further adjustment is necessary, because the motion of the pointer in each sector of 90 degrees varies strictly according to the sine law, just as the pendulum does in its movement. Other advantages will readily occur to those familiar with the art.

Having thus described my invention and illustrated its use, what I claim is the following:

1. An indicating scale comprising a rigid pendulum, a scale and a pivoted and counterweighted pointer angularly moved thereon by the angular movement of said pendulum, and a counterweight acting to hold the pendulum at an angle to the vertical when the pointer is at zero, and the counterweight of the pointer compensating at the middle point, whereby to obtain three positions on the scale in which the angular displacement of the pendulum is exactly proportional to the displacement of center of gravity from the vertical.

2. An indicating scale including a pendulum, a scale and pointer, circular gearing for rotating the pointer by the angular movement of the pendulum, and counterweights arranged on the pendulum and pointer to compensate for the discrepancy between the pendulum's angular movement and its horizontal displacement from the vertical, substantially as described.

3. In a scale, the combination of a pivoted pendulum, a drum attachment supporting a weight normally holding the pendulum at an angle to the vertical position, a scale and counterweighted pointer, a direct gearing of said pointer with the pendulum, said counterweights arranged to compensate for the discrepancy between the angular movement of the pendulum and its lateral displacement from the vertical, substantially as described.

4. In a scale, the combination with a pendulum and a back balance weight geared thereto to hold it normally at an angle to the vertical, of a scale pointer and gearing connecting the pendulum with said pointer, said pointer having a weighted butt arranged to compensate, in moving the pointer, for the variation between lateral displacement of the pendulum and its movement along an arc, substantially as described.

5. In an automatic indicating scale, the combination of a pivoted disk, a flexible band thereon, a lever supporting the object to be weighed attached to one end of said band, a counterweight attached to the other end of the band, a pendulum fixed to said disk and carrying a gear sector, a scale pointer having a pinion engaging said gear sector to turn the pointer angularly in proportion to the angular movement of the pendulum, and a counterweight on the pointer adjusted to vary its angular movement independently of the pendulum and thus correct for the variation between the sine and the arc of movement of the pendulum, substantially as described.

6. An indicating weighing scale comprising a pivoted rigid arm carrying a pendulum, a circular scale and a counterweighted pointer traveling over the scale and geared directly to said rigid pendulum arm, a drum on the pivot of the said rigid arm and a flexible band connected to the receiving pan of the scale on one side of said drum and carrying a back balance weight on the other side, said weight operating to hold the pendulum out of the vertical when the pointer is at zero on the scale, and the pointer counterweight acting to correct discrepancies between the lateral and circular displacements of the pendulum, substantially as described.

In testimony whereof I have hereunto affixed my signature in the presence of two witnesses.

EDWARD McGARVEY.

Witnesses:
W. A. HECKMAN,
EDWIN O. JOHNS.